United States Patent
Wippermann

[15] 3,695,655
[45] Oct. 3, 1972

[54] DISCONNECTABLE RIGID CONNECTION OF MOUNTING PARTS ESPECIALLY FURNITURE WALLS

[72] Inventor: Josef Wippermann, Paderborn, Germany

[73] Assignee: Richard Heinze, Herford/Westphalia, Germany

[22] Filed: Jan. 29, 1970

[21] Appl. No.: 6,684

[30] Foreign Application Priority Data

June 11, 1969 Germany..........P 19 29 685.6

[52] U.S. Cl. .............287/20.92 F, 85/83, 151/41.73
[51] Int. Cl. ..............................................F16b 12/14
[58] Field of Search ..287/20.92 F, 20.92 E, 20.92 K; 85/82, 83, 72, 39, 4, 84; 151/41.73

[56] References Cited

UNITED STATES PATENTS

| | | | |
|---|---|---|---|
| 363,074 | 5/1887 | Lockwood | 85/4 UX |
| 1,182,015 | 5/1916 | Kennedy | 85/72 |
| 1,476,501 | 12/1923 | Ferry | 287/20.92 E |
| 2,630,857 | 3/1953 | Cohen | 287/20.92 E X |
| 2,677,160 | 5/1954 | Peterson | 287/20.92 E X |
| 3,312,139 | 4/1967 | DiChristina | 287/20.92 E X |
| 3,339,953 | 9/1967 | Bohn | 85/4 X |
| 3,421,564 | 1/1969 | Neuschotz | 151/41.76 X |
| 3,424,051 | 1/1969 | Baugh | 85/55 X |
| 3,462,114 | 8/1969 | O'Dell et al. | 85/4 UX |
| 3,504,723 | 4/1970 | Cushman et al. | 151/41.76 X |

FOREIGN PATENTS OR APPLICATIONS

| | | | |
|---|---|---|---|
| 449,331 | 4/1968 | Switzerland | 151/41.73 |

*Primary Examiner*—David J. Williamowsky
*Assistant Examiner*—Wayne L. Shedd
*Attorney*—Sparrow and Sparrow

[57] ABSTRACT

Improved connection between two mounting parts. There is used at least one connecting element attached to one of the mounting parts which has a pin protruding into a bore of the other mounting part and thereby taking up the shear forces while additional tensioning means, acting in direction of the bore are provided to tighten both mounting parts against each other.

11 Claims, 40 Drawing Figures

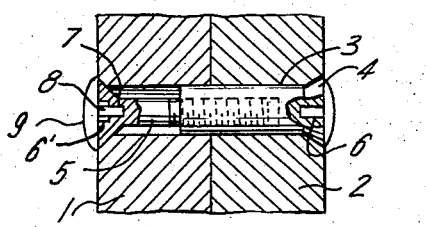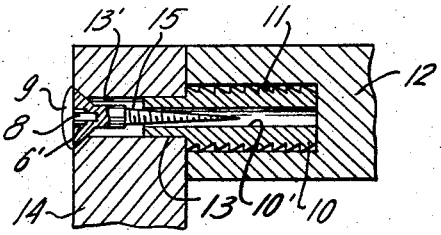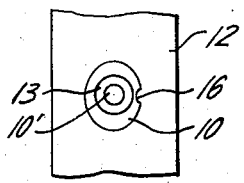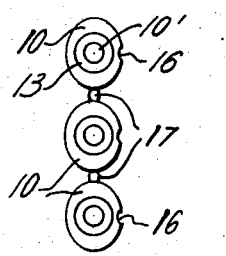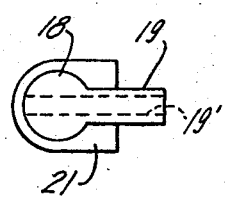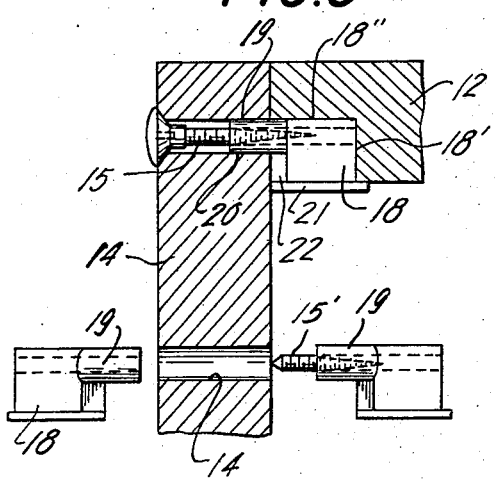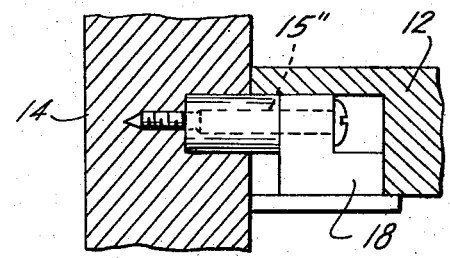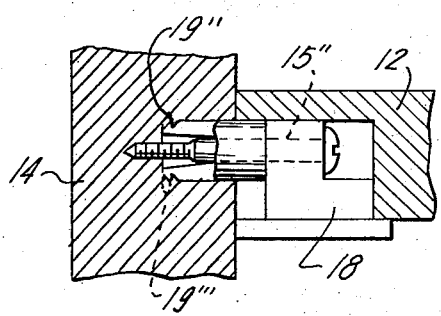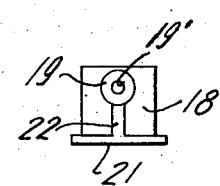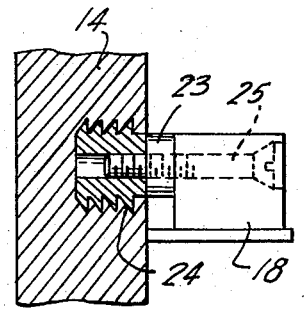

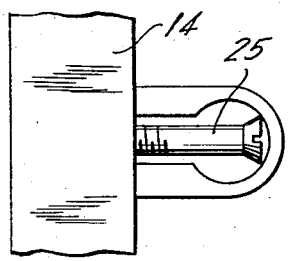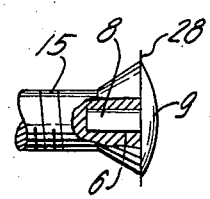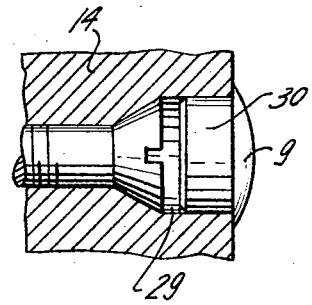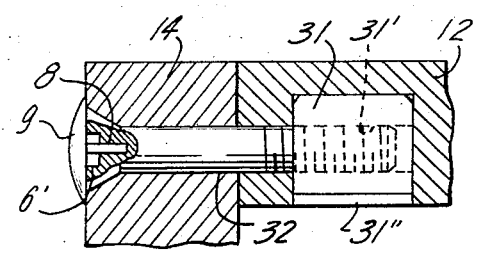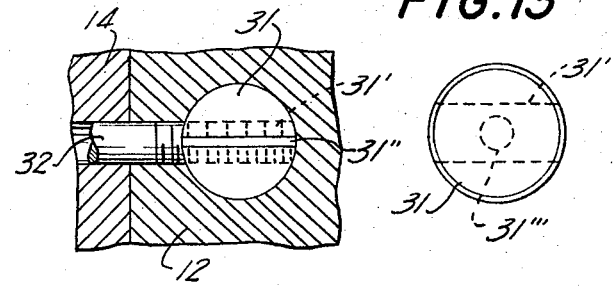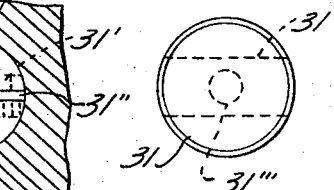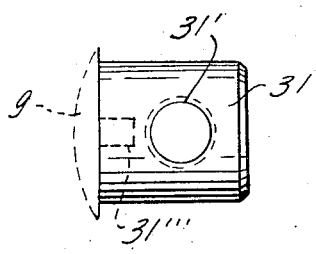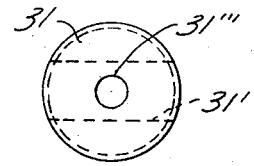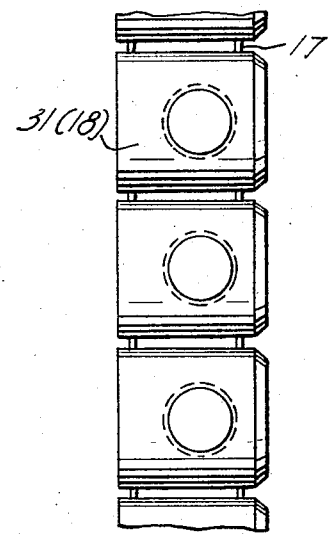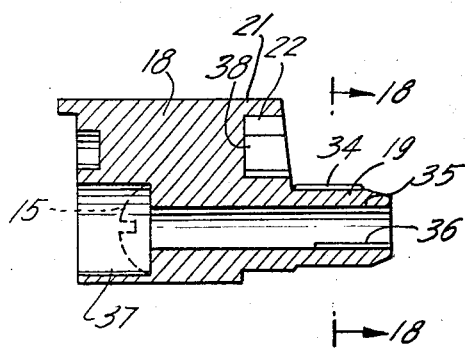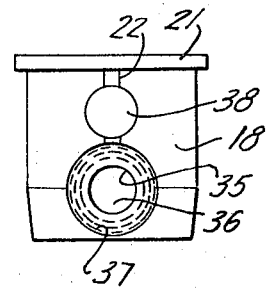

PATENTED OCT 3 1972 3,695,655

DISCONNECTABLE RIGID CONNECTION OF MOUNTING PARTS ESPECIALLY FURNITURE WALLS

BACKGROUND OF THE INVENTION

In many technical fields especially in the production of furniture there exists the problem of connecting rigidly two disconnectable construction parts in a simple but safe manner. For this it is important to compensate possibly existing shear forces between the connected parts.

SUMMARY

According to the invention this problem of connecting rigidly but disconnectably two mounting parts is solved by using at least one connecting element attached to one of the mounting parts and protruding into a bore of the other mounting part and thereby taking up the shear forces while additional tensioning means, acting in the axial direction of the bore are provided to tighten both mounting parts against each other. The pin itself may be shaped as a tightening screw. By this construction a rigid mounting connection of parts is attained which is considerably superior in strength to conventionally known connections.

Various further and more specific purposes, features and advantages will clearly appear from the detailed description given below taken in connection with the accompanying drawings which form part of this specification and illustrate merely by way of examples embodiments of the device of the invention.

BRIEF DESCRIPTION OF DRAWING

In the following description and in the claims, parts will be identified by specific names for convenience, but such names are intended to be as generic in their application to similar parts as the art will permit. Like reference characters denote like parts in the several figures of the drawings, in which FIG. 1 is a section of a connection between two central walls, or adjacent walls of side by side arranged furniture pieces, FIG. 2 is a section of a corner connection of two furniture walls, FIGS. 3 and 4 show side and front views of a hollow insert, FIG. 4a shows the front view of a chain of connecting shear plugs or dowel pins, FIG. 5 is a section through a modified form of corner connection, usable also as an intermediate shelf connection, FIG. 5a is a modification of FIG. 5, FIG. 5b is a further modification of FIG. 5, FIGS. 6 and 7 show a plan view and a side view, respectively, of a connecting piece in the construction of FIG. 5, FIG. 8 shows a side view of a connecting piece similar to the one seen in FIG. 7 with separate dowel pins, FIG. 9 shows a front view of a connecting piece according to FIG. 8, FIG. 10 is a cover cap for tightening screws according to FIG. 2 and 5, FIG. 11 is a cover cap of modified construction in view of FIG. 10, FIGS. 12 and 13 is a modified connecting block in a vertical and horizontal cross-section, respectfully, of the furniture, FIGS. 13' to 13''' are modifications of FIG. 12 and 13, FIG. 14 is a chain of connecting pieces according to FIG. 12 and 13 held together by narrow necks FIGS. 15 to 18 are connecting pieces similar to FIG. 5 to 7 in longitudinal section, plan and side views and in cross-section along the line XVIII — XVIII of FIG. 15, respectively

DESCRIPTION OF THE PREFERRED EMBODIMENT

Figure 16:
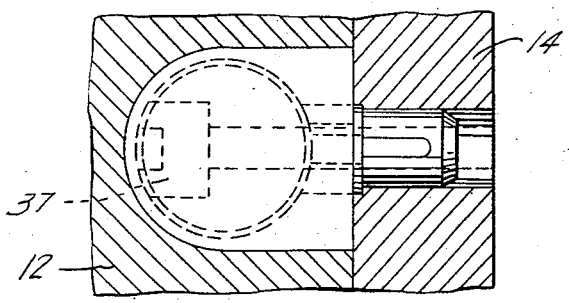

In FIG. 1, the numbers 1 and 2 designate two furniture walls, that is, adjacent sidewalls of two closely positioned furniture pieces, joined together by a socket-like connecting plug 3. The latter, is held on the furniture wall 2 with its enlarged end and the threaded hole thereof is engaged by a screw 5, passing wall 1. The length of socket 3 is greater than the thickness of wall 2, so that the shear forces between both furniture pieces are absorbed by plug 3. The latter and screw 5 may be provided on their enlarged top ends with bores 6 and 7, respectively which may receive a cap 9 having a pin. The cap maybe made of plastics having the color of the furniture in order to obtain a goodlooking surface. The embodiment shown in FIGS. 2 to 4 is concerns a corner connection. A plug 10 is inserted into a blind hole 11 of a cover or bottom plate 12 of a furniture piece, so that only a cylindrical hollow pin 13 projects from the front face of plate 12. Pin 13 fits into a corresponding bore 13' of the side wall 14, into which from the outside a wood screw 15 is inserted engaging the bore 10'. Pin 13 is also absorbing the shear forces in this case, while the wood screw 15, which may be also covered by a cap 9, tightens firmly to the parts 12 and 14. The cross-section of the plug 10, as it may be seen from FIG. 4 and 4a, is preferably oval, and the plug so inserted in the bore in such manner that the larger diameter is parallel to the wall surface, thereby preventing a bursting of the wood of the wall. A longitudinal groove 16 serves as a glue groove. All countersunk heads of the screws 5, 15 or plugs 3 preferably not only are provided with a head bore 6 for the cap 9 but also with a screwdriver slot 6'. Furthermore, the screws have a thin cylindrical core and thin thread flanges like screws for boards pressed of woodchips. As it may be seen from FIG. 4a, plugs 10 (made of plastics), are kept together by little bridges 17 before being inserted which are formed by the same material as the plugs during the production thereof, and are simply sheared off like a wire stitch of a stitching machine by a driving-in-instrument.

The bridge connection of plugs 10 makes it possible to keep the correct direction, so that the oval is always in the proper position relative to the wall. A metal thread screw may be also used instead of a wood screw 15, if the plug 10 has a correspondingly prepared bore 10'.

A modified construction piece is shown in FIG. 5 to 7. It is especially useful, when the connecting piece has to carry heavier loads, for example, of a cupboard shelf. In this embodiment the connecting piece is a block 18 of a larger diameter on which a cylindrical stud 19 of a smaller diameter with an inner bore 19' is moulded in one piece. Stub 19 projects into a bore 20 of the side wall 14 and holds a screw 15 as in the example shown in FIGS. 2 to 4. Block 18 projects into a bore 18' in the underside of plate 12 and has a plate-like flange 21 at its end, against which the supporting plate 12 can abut. Flange 21 abuts closely to the sidewall 14, and the three parts 18, 19, 21 are connected by a ridge 22, which increases the stability. It is advantageous to increase the height of the ridge in the direction towards the pin having the smaller diameter by a small slope of 3 degrees in order to simplify the assembly of the mounting parts, whereby the ridge may be moved by the tightening screw after the assembly the pin abuts against the adjacent mounting part. At the assembly, the block 18 is first put with its extension 19 into bore 20 of the side wall 14. Thereafter the bottom or the supporting plate 12, which has corresponding recesses 18', 18'' or 44, 45 (FIG. 23), is slid on block 18.

Thereafter, the screw 15 is inserted which will hold, the parts 12 and 14 rigidly together after final tightening.

Numeral 14 may designate a center wall. As may be seen in FIG. 5, the studs of two blocks 18 may be inserted from both sides into a bore 14'. One of the studs 19 has a woodscrew 15' without a head, on which the other stud 19 may be screwed, until both blocks 18 abut the wall 14 in the proper position, As it is shown in FIGS. 5a and 5b, the blocks may be also held by an inserted wood screw 15'', wherein, as shown in FIG. 5b, the stud 19'' may be a slotted expanding dowel provided with barbs 19'''.

In the modification of FIGS. 8 and 9 the projection 23 with the smaller diameter on block 18 reaches only up to the surface of wall 14, while part 14, positioned in wall 24 is formed as a separate barb-dowel. Conveniently it is inserted in the wall before mounting and for tightening it is engaged by a screw, for example by a metal screw 25 passing through block 18.

In FIG. 10 a cover cap 9 is shown with a feathered sharp edge 28.

Another modified cover cap is shown in FIG. 11 for the case that the countersunk screw is inserted in a counterbored bore 29 of wall 14; then the pin 30 of cap 9 fills the entire bore 29.

The connecting block 31 shown in FIGS. 12, 13 having a central bore 31' is inserted into a wall 12 at a certain distance from an adjacent wall 14 and either a self-threading stud or a metal screw 32 is inserted into central bore 31' passing through wall 14. Block 31 serves in this case to transmit the large forces of screw 32 to a more extended surface of the wall 12. Block 31 itself which may consist of tough plastics is able to withstand these forces without damage. In this embodiment an extremely rigid connection is obtained by large force that is by approximately 200 kg tension force, whereby the tightly fitted screw bolt 32 takes the shear force. A screwdriver slot 31'' arranged parallel to bore 31' provides a good orientation.

Blocks shown in FIGS. 6 to 9, 12 and 13 by connecting portions into a chain of correctly aligned pieces (FIG. 14) from which they may be separated piece by piece at assembly by a driving-in tool. In case of FIGS. 12, 13 the alignment screwdriver slot 31'' may be omitted and according to FIG. 13' to 13'' a bore 31''' may be provided for receiving the pin of a cap 9.

Figure 19:
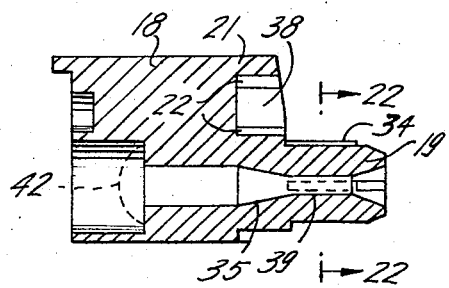
FIG. 19 to 22 show views and sections of a further embodiment of the invention.
Figure 18:
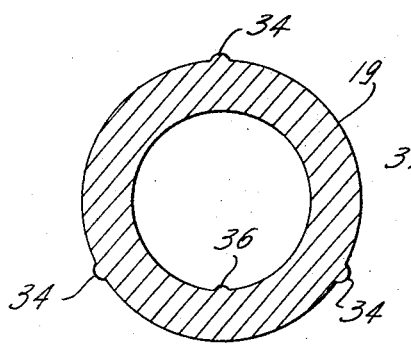
Figure 20:
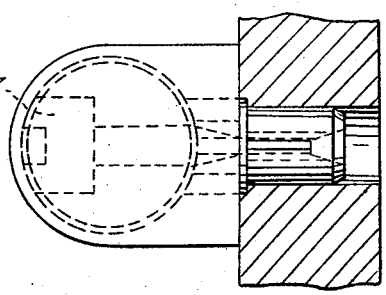
Figure 22:
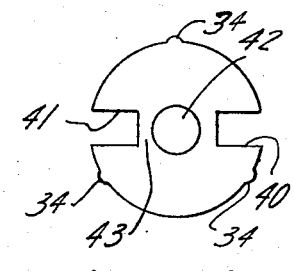
Figure 21:
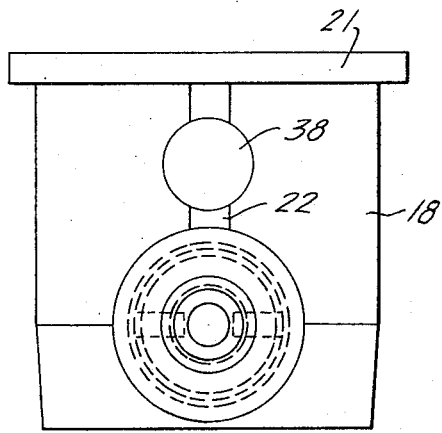

The construction shown to FIG. 15 to 18 is similar to the one of FIGS. 5 to 7. A block 18 is provided with a flange plate 21 and with a projection 19. Parts 18, 19, 21 maybe also connected with one another by an intermediate portion 22 similar to FIG. 5. The projection 19 has one or more ribs 34 on the outside thereof in order to hold it in place in the wall and for compensating of manufacturing tolerances. A bore 35 is provided with a rib 36 for receiving a tightening screw 15 in order to insert the tightening screw loosely and prevent it from dropping out. Tightening screw 15 shown in dotted lines in FIGS. 15 and 19 may have a head 42 positioned in a recess 37 to avoid protruding parts of metal.

A similar construction is shown in FIG. 19 to 22 in which projection 19 a reduction 39 of the bore 35 so that the tightening screw will cause projection 19 to expand and to burst. Furthermore the projection 19 has radial recesses 40 and 41 closely reaching to reduction 39. When tightening screw 42 is inserted the thin parts 43 of the wall with crack without losing their contact surface with the tightening screw and without loss of locking force. When the screw is removed the cracks practically close to their original form.

Figure 23:
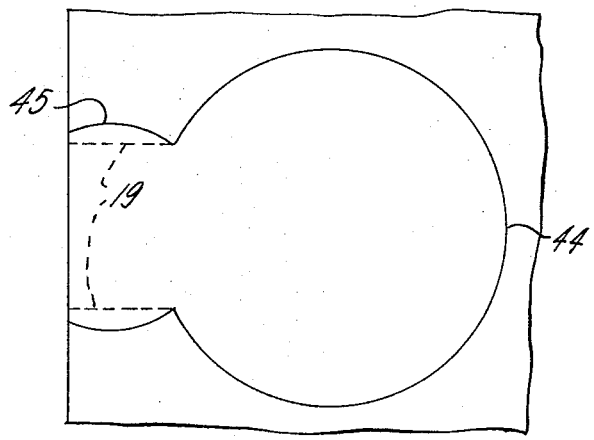
FIG. 23 is a plan view of the bore in the furniture bottom for inserting a connecting piece according to FIGS. 5, 5a, 5b, 6 to 9, 12, 15 to 22.
Figure 24:
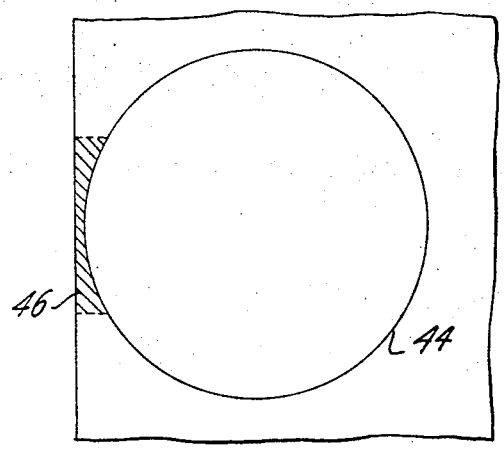
FIG. 24 is a modification of FIG. 23.

In FIGS. 23 and 24 examples are shown as to how the furniture wall parts can be prepared for receiving the connecting elements 18. In the embodiment shown in FIG. 23 the bore 44 serves for receiving the block 18 with the larger diameter while by the smaller bore 45 so much material is removed that intermediate position 22 with projection 19 fits in the remaining opening. In the embodiment shown in FIG. 24 the conditions are selected such that only a single bore 44 for the larger diameter of block 19 is needed while by the close proximity of this bore to the wall surface the remaining wall part 46, can be simply broken away so that a double boring process is avoided.

The embodiment shown in FIG. 25 to 34 is a disconnectable connection releasable by a push button for furniture, doors, traps, convertible beds or the like and particularly suitable for sliding and folding tables.

The cup shaped body 47 (FIG. 25) made of plastics having on the outside ribs 48 for preventing rotation can be driven into a bore 49. By a drop of glue a good hold is guaranted.

Figure 26:
Figure 27:
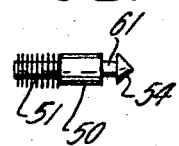
Figure 28:
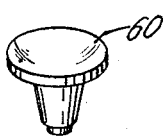
Figure 29:
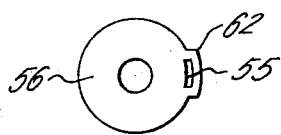
Figure 30:
Figure 31:
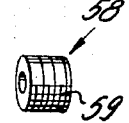
Figure 32:
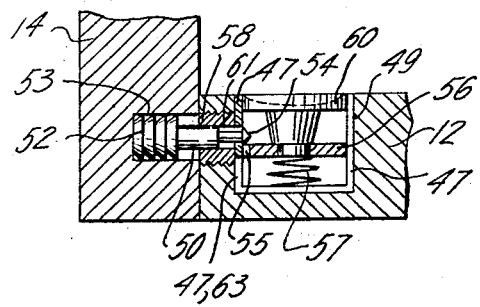

The locking pin 50 (FIG. 27) has a threaded part 51 and is screwed into a plug 52 (FIG. 26). By a driving-in tool (not shown) locking pin 50 together with plug 52 can be inserted to the exact depth into a bore 53 (FIG. 32) so that an adjustment is not needed. When the lock is closed, pin 50 enters with its cone-shaped point 54 the hole 55 of the closing plate 56 (FIG. 29). A helical spring 57 (FIG. 30) holds plate 56 in exact alignment (FIG. 29) for safe locking. A socket 58 (FIG. 31) of plastics having serrations 59 is used for better guiding of locking pin 50 into plug 47 and can be driven in at the same level as plug 52 into the counterpart 12. By operating the push button 60 (FIG. 28) at the head of cup-shaped body 47 (FIG. 25) closing plate 56 (FIG. 29) is pushed out of the groove 61 of locking pin 50 (FIGS. 26 to 27) and is thereby unlocked. Closing plate 56 tilts by the pushing and is guided thereafter by the projection 62 in the rectangular recess 63 of cup 47.

Figure 33:
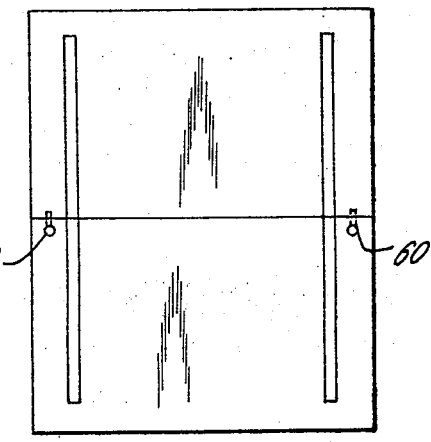
FIGS. 25 to 34 is a connecting piece with a locking catch and a push button.
Figure 25:
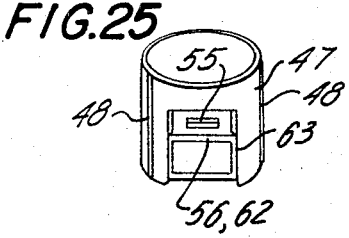
Figure 34:
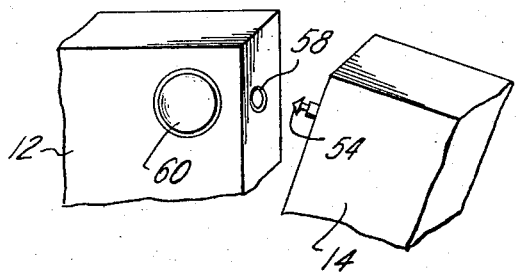

FIG. 33 shows an application of the invention on a sliding table, FIG. 34 an application of the invention on a folding table a folding table.

What I claim is:

1. Fastening systsm for connecting two adjacent plate-like parts, particularly for connecting two walls of furniture, said parts being disposed perpendicularly to each other, said system comprising a cylindrical block member, said member being positioned in a first bore hold in the underside of the first one of said plate-like parts, the axis of said cylindrical block member being perpendicular to the surface of said underside of said plate-like first part, a screw member anchoring said cylindrical block member in the second one of said plate-like parts, a cylindrical stud disposed perpendicular to said axis of said cylindrical block member, said stud integrally formed with said cylindrical block member, said stud at least partly embracing said screw member and engaging a second bore hole in said second part, the diameter of said second bore hole being equal to the diameter of said stud, a laterally projecting plate-like flange on one side of said cylindrical block member, said plate-like flange on one side of said cylindrical block member, said plate-like flange abutting against said surface of said underside of said plate-like first part in the area surrounding said first bore hole in said underside of said plate-like part and abutting against the surface of said plate-like second part.

2. Fastening system according to claim 1, said stud having a length substantially shorter than the thickness of said second plate-like part, and said screw going through said second plate-like part, said screw having a head abutting against the outside surface of said second plate-like part, said screw engaging said stud.

3. Fastening system according to claim 1, said stud consisting of an expandable plug.

4. Fastening system according to claim 3, said stud having longitudinally extending ribs for compensating tolerances and for security against rotation.

5. Fastening system according to claim 4, said stud consisting of a hollow cylinder, longitudinal ribs on the inside of the wall of said cylinder for securing said screw member and preventing the same from dropping out before final tightening and for compensating tolerances.

6. Fastening system according to claim 3, said stud having prepared cracking areas and having a longitudinally extending bore, said bore having a reduced diameter in the center area.

7. Fastening system for connecting two adjacent plate-like parts, particularly for connecting two walls of furniture, said parts being disposed perpendicularly to each other, said system comprising a cylindrical block member, said member being positioned in a first bore hole in the underside of the first one of said plate-like parts, the axis of said cylindrical block member being perpendicular to the surface of said underside of plate-like part, a screw member anchoring said cylindrical block member in the second one of said plate-like parts, a cylindrical stud disposed perpendicular to said axis of said cylindrical block member, said stud integrally formed with said cylindrical block member, said stud at least partly embracing said screw member and engaging a second bore hole in said second part, the diameter of said second hole being equal to the diameter of said stud, a laterally projecting plate-like flange on one side of said cylindrical block member, said plate-like flange located on one side of said cylindrical block member, said plate-like flange abutting against said surface of said underside of said plate-like first part in the area surrounding said first bore hole in said underside of said plate-like part and abutting against the surface of said plate-like second part, said stud consisting of an expandable plug, said plug having a longitudinal opening, said opening extending across said cylindrical block member.

8. Fastening system according to claim 3, said stud consisting of an expandable dowel having a serrated surface.

9. Fastening system according to claim 8, said stud having a cylindrical projection formed on said cylindrical block member, said cylindrical projection extending to said second plate-like part, said expandable dowel being disposed in alignment with said cylindrical projection and said screw member engaging said dowel and fixing said cylindrical member on said dowel.

10. Fastening system according to claim 1, and having two cylindrical block members, one disposed on each side of said second part, the studs of said cylindrical members being positioned in the same opening and being connected by a common screw.

11. Fastening system according to claim 1, said laterally projecting flange of said cylindrical block member having a ridge-like projection thereon, said ridge-like projection being connected to said stud, said ridge-like projection abutting against the surface of said second plate-like part and constituting reinforcing means at the point of connection of said cylindrical block member and said stud.

* * * * *